United States Patent
Jansen et al.

(10) Patent No.: US 8,908,611 B2
(45) Date of Patent: Dec. 9, 2014

(54) MULTIPOINT DATA TRANSMISSION

(75) Inventors: Kaj Jansen, Salo (FI); Markku J. Heikkilä, Oulu (FI); Ulo Parts, Helsinki (FI); Juha Heiskala, Helsinki (FI); Zoltan Safar, Atlanta, GA (US)

(73) Assignee: Nokia Corporation, Espoo (FI)

(*) Notice: Subject to any disclaimer, the term of this patent is extended or adjusted under 35 U.S.C. 154(b) by 1907 days.

(21) Appl. No.: 12/072,638

(22) Filed: Feb. 26, 2008

(65) Prior Publication Data

US 2008/0268887 A1    Oct. 30, 2008

(30) Foreign Application Priority Data

Feb. 26, 2007    (FI) ..................................... 20075142

(51) Int. Cl.
  *H04B 7/26* (2006.01)
  *H04B 7/02* (2006.01)

(52) U.S. Cl.
  CPC ..................................... *H04B 7/022* (2013.01)
  USPC ....................................................... 370/329

(58) Field of Classification Search
  USPC ........... 375/145; 370/336, 329, 333, 328, 338
  See application file for complete search history.

(56) References Cited

U.S. PATENT DOCUMENTS

| | | | | |
|---|---|---|---|---|
| 7,236,740 | B2 * | 6/2007 | Koo et al. | 455/13.4 |
| 7,280,495 | B1 * | 10/2007 | Zweig et al. | 370/312 |
| 7,738,437 | B2 * | 6/2010 | Ma et al. | 370/342 |
| 2004/0218698 | A1 * | 11/2004 | Jonsson et al. | 375/343 |
| 2006/0293056 | A1 * | 12/2006 | Kim et al. | 455/442 |
| 2007/0097915 | A1 * | 5/2007 | Papasakellariou | 370/329 |
| 2007/0201370 | A1 * | 8/2007 | Stamoulis | 370/236 |
| 2007/0211616 | A1 * | 9/2007 | Khandekar et al. | 370/203 |

* cited by examiner

*Primary Examiner* — Thai Nguyen
(74) *Attorney, Agent, or Firm* — Harrington & Smith

(57) ABSTRACT

A semi-single frequency network (SFN) concept is presented. According to the SFN concept, the same data signal is transmitted from multiple base stations to a mobile terminal simultaneously on the same frequency band. Accordingly, the transmitted signals are combined in the radio channel and the mobile terminal experiences the transmitted signals as one signal propagated through a multipath channel. Additionally, each base station transmits a base station specific pilot signal. The mobile terminal carries out a channel estimation procedure for each received pilot signal and combines the channel estimates to obtain information how to equalize the received data signal. Then, the mobile terminal calculates equalization weights from the combined channel estimates and equalizes the received data signal.

31 Claims, 2 Drawing Sheets

US 8,908,611 B2

MULTIPOINT DATA TRANSMISSION

FIELD

The invention relates to a mobile telecommunication system providing both broadcast/multicast and unicast data transmission services.

BACKGROUND

A single-frequency network refers to a wireless transmission system in which the same data is transmitted from multiple transmit stations simultaneously on the same frequency band. To be more exact, an identical signal is transmitted simultaneously from the transmit stations. When a radio receiver receives the data signals transmitted from the multiple base stations, a received data signal is a combination of the transmitted data signals. This is because the data signals transmitted on the same frequency band simultaneously sum up in a radio channel before they are received at the radio receiver. Since the transmitted data signals summed in the radio channel are identical, the radio receiver experiences the signals as multipath-propagated signals. Naturally, each of the transmitted signals propagates to the radio receiver through multiple paths in the radio channel, causing more multipath components.

For example, let us assume that two transmit stations transmit the same data signal simultaneously on the same frequency band to a radio receiver and that each of the two transmitted data signals propagate to the radio receiver through 4 different paths. Accordingly, the radio receiver experiences a received radio signal as having 2*4=8 multipath components.

The single-frequency network may be seen as a type of handover in which signal combining takes place in the radio channel. The single-frequency network concept may be used for extending coverage in telecommunication systems where a symbol time is long with respect to an expected signal arrival time difference. A system using orthogonal frequency division multiplexing (OFDM) as a transmission scheme is a good candidate for the single-frequency network concept due to the long duration of an OFDM symbol. Accordingly, the single-frequency network is utilized in digital video broadcasting (DVB) systems.

BRIEF DESCRIPTION OF THE INVENTION

An object of the invention is to provide an improved solution for the single-frequency concept.

According to an aspect of the invention, there is provided a method, comprising assigning to a base station of a mobile telecommunication system the same pilot sequence for use in a unicast data transmission and in another type of data transmission in which the same data signal is transmitted simultaneously on the same frequency band from a plurality of base stations to a mobile terminal.

According to another aspect of the invention, there is provided a method, comprising: receiving a data signal and a plurality of different pilot sequences transmitted from a plurality of base stations, calculating a plurality of radio channel estimates from the plurality of received pilot sequences, and equalizing the received data signal by utilizing the calculated plurality of radio channel estimates.

According to another aspect of the invention, there is provided an apparatus, comprising a processing unit configured to assign to a base station of a mobile telecommunication system the same pilot sequence for use in a unicast data transmission and in another type of data transmission in which the same data is transmitted simultaneously on the same frequency band from a plurality of base stations to a mobile terminal.

According to another aspect of the invention, there is provided an apparatus comprising an interface configured to receive a data signal and a plurality of different pilot sequences, wherein each of the plurality of pilot sequences is associated with one of a plurality of base stations. The apparatus further comprises a processing unit configured to calculate a plurality of radio channel estimates from the plurality of received pilot sequences, to equalize the received data signal by utilizing the calculated plurality of radio channel estimates, and to detect data comprised in the equalized multicast data signal.

According to another aspect of the invention, there is provided a mobile telecommunication system. The mobile telecommunication system comprises an apparatus comprising a processing unit configured to assign to a base station of a mobile telecommunication system the same pilot sequence for use in a unicast data transmission and in another type of data transmission in which the same data signal is transmitted simultaneously on the same frequency band from a plurality of base stations to a mobile terminal. The mobile telecommunication system further comprises the mobile terminal comprising an interface configured to receive the data signal and a plurality of different pilot sequences, wherein each of the plurality of pilot sequences is associated with one of the plurality of base stations, and a processing unit configured to calculate a plurality of radio channel estimates from the plurality of received pilot sequences, to equalize the received data signal by utilizing the calculated plurality of radio channel estimates, and to detect data comprised in the equalized multicast data signal.

According to another aspect of the invention, there is provided an apparatus comprising means for assigning to a base station of a mobile telecommunication system the same pilot sequence for use in a unicast data transmission and in another type of data transmission in which the same data signal is transmitted simultaneously on the same frequency band from a plurality of base stations to a mobile terminal.

According to another aspect of the invention, there is provided an apparatus comprising means for receiving a data signal and a plurality of different pilot sequences associated with a plurality of base stations, means for calculating a plurality of radio channel estimates from the plurality of received pilot sequences, means for equalizing the received data signal by utilizing the calculated plurality of radio channel estimates, and means for detecting data comprised in the equalized multicast data signal.

According to another aspect of the invention, there is provided a computer program distribution medium readable by a computer and encoding a computer program of instructions for executing a computer process, comprising: assigning to a base station of a mobile telecommunication system the same pilot sequence for use in a unicast data transmission and in another type of data transmission in which the same data signal is transmitted simultaneously on the same frequency band from a plurality of base stations to a mobile terminal.

According to another aspect of the invention, there is provided a computer program distribution medium readable by a computer and encoding a computer program of instructions for executing a computer process, comprising: receiving a data signal and a plurality of different pilot sequences associated with a plurality of base stations, calculating a plurality of radio channel estimates from the plurality of received pilot sequences, equalizing the received data signal by utilizing the calculated plurality of radio channel estimates, and detecting data comprised in the equalized multicast data signal.

LIST OF DRAWINGS

In the following, the invention will be described in greater detail with reference to the embodiments and the accompanying drawings, in which FIG. 1 shows a data transmission scheme according to an embodiment of the invention implemented in a mobile telecommunication system;

DESCRIPTION OF EMBODIMENTS

Figure 1:
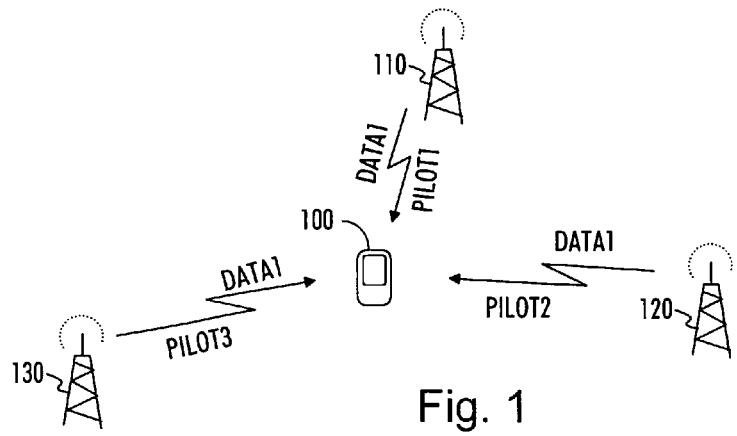

The single-frequency concept may also be utilized in mobile communication systems. In many mobile communication systems, a unique pilot sequence is assigned for every base station in a limited geographical area. Two base stations sufficiently apart from each other may, however, use the same pilot sequence. Each of the base stations transmits the assigned pilot sequence repeatedly to enable mobile terminals receiving the pilot sequence to carry out radio channel measurements for handover, power control, and other purposes. In known solutions, transmitters of the single-frequency network are assigned the same pilot sequence so that the pilot sequences are also combined in the radio channel, and the radio receiver sees the transmitted plurality of pilot sequences as a single pilot sequence.

When utilizing the single-frequency network concept in a conventional mobile communication system, a problem arises when two (or more) base stations transmit the same data signal to a mobile terminal simultaneously on the same frequency band. When utilizing the single-frequency network concept directly in conventional mobile telecommunication systems, a base station would be assigned at least two pilot sequences: one for unicast transmissions and one for single-frequency network transmissions. Assignment of a separate pilot sequence for a unicast transmission, i.e. a conventional transmission from a single base station to a single mobile terminal, and for a transmission in which multiple base stations transmit the same signal simultaneously to a single mobile terminal results in an excessive use of limited resources and calls for optimization.

The single-frequency concept may be used, for example, in a multicast and/or a broadcast multimedia service in which multiple base stations located close to each other transmit the same data simultaneously on the same frequency band. Such a service may be Multimedia Broadcast Multicast Service (MBMS), which is a broadcasting service that can be provided via existing UMTS (universal mobile telecommunication system) cellular networks. The MBMS for the UMTS is described in the UMTS release 6 specification provided by the 3$^{rd}$ Generation Partnership Project.

As is well known, the UMTS also supports unicast services in which a dedicated communication link is established between a base station of a UMTS radio access network and a mobile terminal served by the base station, and data intended for only that particular mobile terminal is transmitted over the communication link. The term 'dedicated communication link' is to be understood to also include shared communication channels, such as Downlink Shared Channel (DSCH) utilized in High-speed Downlink Packet Access (HSDPA). With the MBMS, the UMTS also supports multicast and broadcast data transmission in which the same data may be transmitted simultaneously from one or more base stations to multiple mobile terminals. In the UMTS providing both unicast data transmission and the single-frequency concept in conjunction with the MBMS, the problem resulting in the need to allocate a separate pilot sequence for unicast transmissions and the single-frequency network concept is evident.

From now on, let us refer to the single-frequency concept with a term 'multipoint transmission', which describes better the idea of transmitting the same signal from multiple transmitters simultaneously on the same frequency band. Preferably, the multipoint transmission according to embodiments of the invention may be used in multicast and/or broadcast (multi)media services.

With reference to FIG. 1, examine an example of a mobile telecommunication system in which embodiments of the invention can be applied. The mobile telecommunication system may utilize orthogonal frequency division multiple access (OFDMA) as a downlink data transmission scheme based on the 3.9$^{th}$ generation system, known also as long-term evolution (LTE) system, standardized within the 3GPP.

A mobile terminal 100 is located such that it is capable of receiving signals from three base stations 110, 120, and 130. A first base station 110, a second base station 120, and a third base station 130 capable of communicating with the mobile terminal 100 are all configured for multipoint transmission. Additionally, each of the base stations configured for the multipoint transmission is assigned the same pilot sequence to be used for the unicast data transmission and for the multipoint transmission. A different pilot sequence is assigned to each base station 110, 120, and 130, i.e. the pilot sequence is a base station specific pilot sequence. As a consequence, the mobile telecommunication system providing the multipoint data transmission according to this embodiment of the invention may be seen as a semi-single frequency network because the base stations transmitting data according to the single frequency network concept transmit different pilot sequences.

As an example, let us assume that the mobile terminal 100 is configured to receive a broadcast multimedia service provided in a geographically limited area. The base stations 110, 120, and 130 are configured to broadcast the multimedia service with the multipoint transmission scheme according to an embodiment of the invention. In other words, the first base station 110, the second base station 120, and the third base station 130 transmit the same broadcast data signal simultaneously on the same frequency band. The operation of the base stations 110, 120, and 130 may be synchronized with each other such that the mobile terminal 100 is able to receive the signals transmitted from the base stations 110, 120, and 130 within one OFDM symbol duration. In other words, the synchronization enables a proper summation of the same transmitted signals in the radio channel.

Referring to FIG. 1, the base stations 110, 120, and 130 transmit the same data signal DATA1 simultaneously on the same frequency band. Additionally, each of the base stations 110, 120, and 130 transmits a pilot sequence assigned to the corresponding base station. That is, the first base station 110 transmits a pilot sequence PILOT1, the second base station 120 transmits a pilot sequence PILOT2, and the third base station 130 transmits a pilot sequence PILOT3. The pilot sequences PILOT1, PILOT2, and PILOT3 are different from each other. The pilot sequences PILOT1, PILOT2, and PILOT3 are transmitted together with the data signal DATA1. The signals may be transmitted according to the OFDM data transmission scheme defined in the 3GPP specifications. To be more specific, a multicarrier signal is transmitted within one OFDM symbol duration, and the multicarrier signal comprises a plurality of subcarriers, each carrying information symbols. Symbols of the pilot sequences PILOT1, PILOT2, and PILOT3 may be transmitted periodically on determined subcarriers, and other subcarriers may be allocated for transmission of the data signal or other signals.

Furthermore, the subcarriers of the multicarrier signal may be divided into a plurality of frequency resource blocks, each comprising a determined number of subcarriers (12 according to the 3GPP specifications). A portion of the frequency resource blocks may be allocated for the multipoint transmission and a portion of the frequency resource blocks may be allocated for the unicast data transmission and/or for other transmission types. As indicated above, the same pilot sequence is assigned to a base station 110, 120, or 130 for both unicast and multipoint transmission. Accordingly, the base station 110, 120, or 130 may transmit the same pilot sequence in the frequency resource blocks allocated for the multipoint transmission and in the frequency resource blocks allocated for the unicast data transmission.

As mentioned above, since the base stations 110, 120, and 130 transmit the identical data signal DATA1 simultaneously on the same frequency band, the data signal DATA1 is combined in the radio channel and the mobile terminal 100 experiences the data signal DATA1 as a single data signal which has traveled through a multipath radio channel. In other words, the mobile terminal 100 is not able to deduce directly from the received data signal DATA1, which components of the received data signal DATA1 originate from which one of the base stations 110, 120, and 130. The mobile terminal 100 is, however, able to obtain information on the radio channel environments between the mobile terminal 100 and the base stations 110, 120, and 130 from the respective received pilot sequences PILOT1, PILOT2, and PILOT3. As known in the art, a pilot sequence is a sequence known in a receiver. Accordingly, the mobile terminal 100 has knowledge on the transmitted pilot sequences PILOT1, PILOT2, and PILOT3, and it may calculate a radio channel impulse response or frequency response from the received pilot sequences.

To be more specific, the received pilot sequence PILOT1 contains information on the radio channel between the mobile terminal 100 and the first base station 110. Similarly, the received pilot sequences PILOT2 and PILOT3 contain information on the radio channels between the mobile terminal 100 and the second base station 120 and the third base station 130, respectively. Now, the mobile terminal is able to estimate the multipath components of the received data signal DATA1 with a channel estimation procedure described below with reference to FIG. 2.

Before the actual channel estimation, the mobile terminal 100 may calculate reception power levels of the received pilot sequences PILOT1, PILOT2, and PILOT3 to determine, which pilot sequence to select for the channel estimation. If a given pilot sequence is received with a very low reception power level, the channel estimation from that pilot sequence and the subsequent equalization will not provide a significant gain in detection of the equalized data signal. This is because the level of a noise component is high with respect to the level of the received pilot signal resulting in increased variance in the channel estimates. In order to avoid unnecessary complexity and calculations in the mobile terminal 100, pilot sequences received with low reception power levels may be discarded from the channel estimation procedure.

Reception power level measurement from received pilot sequences is a common procedure in the mobile terminal 100. Typically, the reception power level measurement is related to a handover procedure but also to estimation of the channel quality (for example the signal-to-interference power ratio). Now, reception power measurement values related to each of the received pilot sequences PILOT1, PILOT2, and PILOT3 are used for selecting pilot sequences received with a sufficient reception power level for channel estimation. A reception power level of each of the received pilot sequences PILOT1, PILOT2, and PILOT3 may be compared with a threshold value, and if the reception power level of a given pilot sequence exceeds the threshold value, the pilot sequence is selected for channel estimation. Let us in our example assume that the first and the second pilot sequence PILOT1 and PILOT2 are received with a sufficiently high reception power level (exceeding the threshold level) and, accordingly, selected for the channel estimation. The third pilot sequence PILOT3 is, however, received with a relatively low reception power level due to high attenuation of the signal in the radio channel. Accordingly, the reception power level of the third pilot sequence PILOT3 is received at a reception power level lower than the threshold level and, therefore, the third pilot sequence is omitted from the channel estimation. Methods other than the reception power level measurement are also possible when selecting pilot sequences for channel estimation.

Next, the channel estimation procedure will be described with reference to FIG. 2. In OFDM receivers, signal processing is typically carried out in a frequency domain because the information symbols are located in a plurality of subcarriers of the multicarrier signal, and discriminating the information symbols from the multicarrier signal would not be feasible in a time domain. Therefore, the channel estimation may also be carried out in the frequency domain. The two pilot sequences selected for the channel estimation, i.e. the pilot sequences PILOT1 and PILOT2, are first converted into a frequency domain through a fast Fourier transform (FFT) in FFT units 200 and 202. In practice, the frequency domain representation of the pilot sequences is obtained by converting the received multicarrier signal into the frequency domain and separating from the converted multicarrier signal the subcarriers carrying the pilot sequences PILOT1 and PILOT2.

Then, the first pilot sequence PILOT1 is applied to a first channel estimation unit 204 and the second pilot sequence PILOT2 is applied to a second channel estimation unit 206. The first and the second channel estimation unit 204 and 206 may estimate radio channel frequency responses from the respective pilot sequences PILOT1 and PILOT2 and output the estimated radio channel frequency responses to an adder 208. Obviously, the radio channel frequency response estimated by the first channel estimation unit 204 represents an estimation of the radio channel between the mobile terminal 100 and the first base station 110, and the radio channel frequency response estimated by the second channel estimation unit 206 represents an estimation of the radio channel between the mobile terminal 100 and the second base station 120. Furthermore, the estimates relate to the same frequency band. The adder 208 sums together the two radio channel frequency response estimates received from the first and the second channel estimation unit 204 and 206. The output of the adder 208, i.e. the sum of the two radio channel estimates, roughly corresponds to a result obtained in case the base stations 110, 120, and 130 transmitted the same pilot sequence when the channel estimation would be based on that single pilot sequence.

The summed channel estimates output from the adder 208 are applied to an equalizer 210 which received the received data signal DATA1 as another input. In fact, the equalizer 210 may receive the frequency domain representation of the data signal DATA1. The equalizer 210 may perform the equalization operation in the frequency domain in order to avoid a complex convolution operation required in the time-domain equalization. The equalizer 210 may calculate weighting factors from the received channel estimates and weight the frequency domain representation of the received data signal DATA1 with the calculated weighting factors. To be more specific, the equalizer 210 may calculate a weight for a frequency domain sample of the data signal from a channel estimate related to that frequency component. The weight may be a complex conjugate of that particular channel estimate, for example. Then, the equalizer 210 may multiply the frequency domain sample of the data signal with the complex conjugate of the channel estimate to equalize the distortion from that frequency. The other frequency components may be processed correspondingly. As a result, a frequency domain representation of an equalized data signal is obtained. The equalized data signal may then be forwarded to further processing including data demodulation and detection.

In the description above, the channel estimation units 204 and 206 estimate the channel responses from the frequency domain samples of the pilot sequences PILOT1 and PILOT2, respectively. In an alternative embodiment, the channel estimation units 204 and 206 may estimate the channel responses from the time domain samples of the pilot sequences PILOT1 and PILOT2, respectively. The estimated time domain samples may then be trans-formed into the frequency domain through FFT before or after the adder 208. In order to avoid computation of two FFTs, it may be advantageous to first sum the channel estimates in the adder 208 and then transform the result into the frequency domain.

The mobile terminal 100 may additionally have a two-directional communication link with one of the base stations 110, 120, and 130 acting as a serving base station. As a consequence, the mobile terminal 100 may receive unicast data transmitted from the serving base station. According to an embodiment of the invention, the mobile terminal 100 may use the channel estimates calculated from the pilot sequence of the serving base station also as channel estimates for the unicast data. For example, let us assume that the first base station 110 has a unicast communication link established with the mobile terminal 100. Data may be transmitted over the unicast communication link through dedicated channels or shared channels. Additionally, the first base station 110 is transmitting data to the mobile terminal according to the multipoint transmission scheme. The channel estimation for the multipoint transmission may be carried out in the mobile terminal 100 as described above with reference to FIG. 2. Additionally, the channel estimates provided by the first channel estimation unit 204, i.e. the channel estimates calculated from the pilot sequence PILOT1 received from the first base station 110, may be used as channel estimates also for the unicast data. In that case, the channel estimates output from the first channel estimation unit 204 may also be fed to an equalizer which equalizes data received over the unicast communication link by utilizing the channel estimates provided by the first channel estimation unit 204. In addition to pilot symbols comprised in an OFDM symbol, from which the current channel estimate is calculated, pilot symbols transmitted on at least one of the previously received OFDM symbols may also be utilized when calculating the current channel estimate in order to reduce the variance of the channel estimate.

Figure 3:
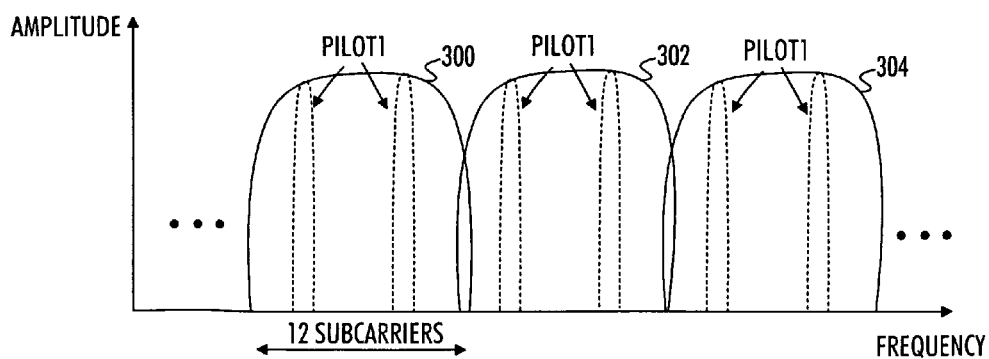
FIG. 3 illustrates a frequency spectrum representation of a data transmission scheme according to an embodiment of the invention.

As mentioned above, the transmission of both multipoint and unicast data may be based on OFDMA in which frequency resource blocks are allocated for data transmission. FIG. 3 illustrates three frequency resource blocks 300, 302, and 304. According to the LTE specification of 3GPP, each frequency resource block comprises 12 subcarriers. Within each frequency resource block 300 to 304, a pilot sequence is transmitted periodically on determined subcarriers. For example, pilot symbols may be transmitted on two subcarriers of a given frequency resource block in every fourth OFDM symbol. In other words, symbols other than pilot symbols may be transmitted on the two subcarriers in three out of four OFDM symbols. Obviously, the number of pilot symbols in a given frequency resource block is quite low, which may hinder the estimation of properties of the radio channel at the frequencies of the frequency resource block.

Let us assume that the frequency resource block 302 illustrated in FIG. 3 is allocated for multipoint transmission, i.e. the base stations 110, 120, and 130 transmit the same signal simultaneously in that frequency resource block 302. Let us further assume that contiguous frequency resource blocks 300 and 304 are allocated for unicast data transmission between the first base station 110 and the mobile terminal 100. Accordingly, the pilot sequence PILOT1 is transmitted in each of the frequency resource blocks 300 to 304. When carrying out channel estimation for the frequency resource block 302 allocated for the multipoint transmission, the channel estimates may be improved by including the pilot symbols transmitted in the contiguous frequency resource blocks in the channel estimation.

The properties of the radio channel typically include correlation between adjacent frequency resource blocks, i.e. the properties of the radio channel will not change significantly within such a short frequency interval. Therefore, the accuracy of the channel estimates may be improved by including pilot symbols from the adjacent frequency resource blocks in the channel estimation. In order to verify a sufficient correlation in the properties of the radio channel between the adjacent frequency resource blocks, a coherence bandwidth of the radio channel may be calculated. The coherence bandwidth may be calculated from a delay spread of the radio channel, as is known in the art. On the basis of the calculated coherence bandwidth, the pilot symbols of the contiguous frequency resource blocks may be selected. If the coherence bandwidth is extremely small, it may be decided that only the pilot symbols transmitted in the frequency resource block 302 under study will be selected. If the calculated coherence bandwidth is broad enough, pilot symbols of a neighboring frequency resource block, i.e. resource blocks 300 and 304, may be selected for the estimation of the radio channel properties on the frequency band of the frequency resource block 302. In addition to the pilot symbols in the neighboring the frequency resource blocks 300 and 304, additional pilot symbols from frequency resource blocks contiguous to frequency resource blocks 300 and 304 may be selected, if the coherence bandwidth is wide enough. Accordingly, the number of contiguous frequency resource blocks, from which pilot symbols are selected for channel estimation of a given frequency resource block, may be selected according to the calculated coherence bandwidth.

In the example of FIG. 3, the pilot sequence PILOT 1 is transmitted in each of the frequency resource blocks 300 to 304. Additionally, the pilot sequences PILOT2 and PILOT3 may be transmitted in the frequency resource block 302. Let us assume that pilot symbols from both contiguous frequency resource blocks 300 and 304 are selected for the channel estimation of frequency resource block 302. Naturally, the pilot symbols transmitted in the frequency resource block 302 under study are included in the channel estimation. The pilot symbols of the frequency resource blocks 300 to 304 are applied to the first channel estimation unit 204 which estimates the channel response from those pilot symbols. The channel estimates are then output to the adder 208, as described above. The second channel estimation unit 206 estimates the channel response from the pilot sequence PILOT2 as described above. The pilot sequence PILOT2 may be transmitted from the second base station in the same frequency resource block 302 and on the same subcarriers as the pilot sequence PILOT1. Alternatively, the pilot sequences PILOT1 and PILOT2 transmitted from different base stations may be transmitted at least partly on different subcarriers.

Naturally, the frequency resource blocks 300 to 304 may be allocated in a different way and still be used for facilitating the channel estimation. For example, the frequency resource block 300 may be allocated for unicast transmission between the first base station 110 and the mobile terminal 100, the frequency resource block 302 may be allocated for multipoint transmission from the base stations 110 to 130 to the mobile terminal 100, and the frequency resource block 304 may be allocated for unicast transmission between the second base station 120 and another mobile terminal (not shown). In that case the pilot sequence PILOT2 would be transmitted in the frequency resource blocks 302 and 304. Accordingly, the first channel estimation unit 204 of the mobile terminal 100 may utilize pilot symbols transmitted in the frequency resource blocks 300 and 302, and the second channel estimation unit 206 may utilize pilot symbols transmitted in the frequency resource blocks 302 and 304. Accordingly, the mobile terminal 100 may have knowledge on the location of pilot symbols of neighboring base stations to enable reception power level measurements related to handover and other procedures. Additionally, a channel estimation unit of another mobile terminal may use the pilot sequences transmitted in the frequency resource blocks 302 and 304 when estimating a channel response between the mobile terminal and the second base station 120.

The embodiments of the invention may be realized in an apparatus controlling one or more base stations of a mobile telecommunication system and in a mobile terminal of the mobile telecommunication system. The apparatus controlling one or more base stations may be a controller (a processing unit) of a base station or a radio network controller of the mobile telecommunication system.

Figure 2:
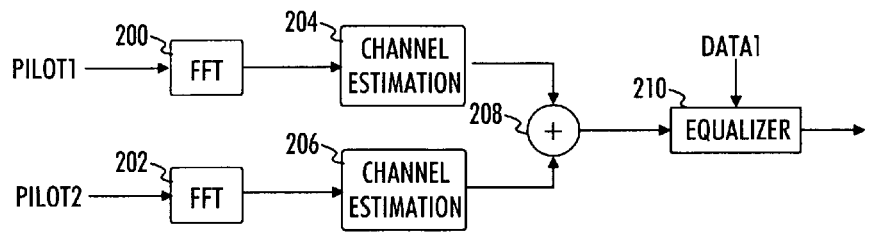
FIG. 2 illustrates a channel estimation procedure according to an embodiment of the invention.
Figure 4:
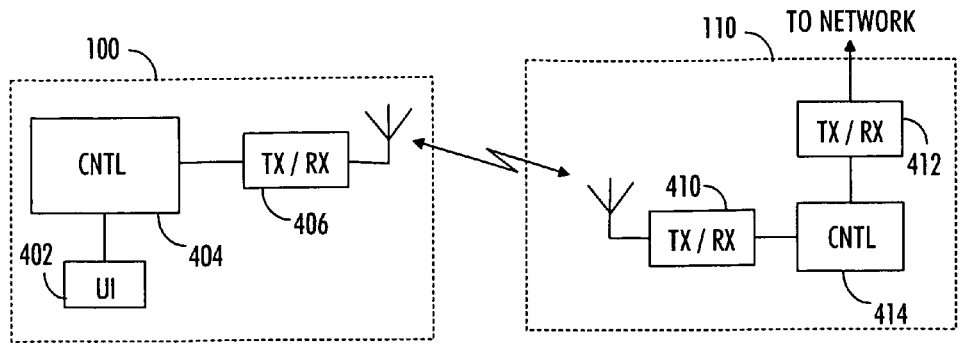
FIG. 4 illustrates block diagrams of a mobile terminal and a base station according to embodiments of the invention.

FIG. 4 is a block diagram illustrating basic components of the mobile terminal 100 and the first base station illustrated in FIG. 2. Other base stations 120 and 130 may have the same basic structure as the first base station 110.

The base station 110 comprises a first communication interface 410 to provide an air interface connection to one or several mobile terminals such as the mobile terminal 100. The first communication interface 410 may perform analog operations necessary for transmitting and receiving radio signals. Such operations may include analog filtering, amplification, up-/downconversions, and A/D (analog-to-digital) or D/A (digital-to-analog) conversion.

The base station 110 may further comprise a second communication interface 412 to provide a wired connection to the network of the mobile telecommunication system. The network of the mobile telecommunication system may provide connections to other networks, such as the Internet and Public Switched Telephone Network (PSTN). The second communication interface 412 may be connected to a radio network controller controlling the operation of the base station 110.

The base station 110 further comprises a processing unit 414 to control functions of the base station 110. The processing unit 414 handles establishment, operation and termination of radio connections with the mobile subscriber units 100 the base station 110 is serving. The processing unit 414 may control the radio connections on the basis of instructions received from the radio network controller. The processing unit 414 may be implemented by a digital signal processor with suitable software embedded in a computer readable medium, or by separate logic circuits, for example with ASIC (Application Specific Integrated Circuit).

The mobile subscriber unit 100 may comprise a communication interface 406 to provide a radio connection with the base station 110. The communication interface may perform analog operations necessary for transmitting and receiving radio signals.

The mobile subscriber unit 100 may further comprise a processing unit 404 to control functions of the mobile subscriber unit 100. The processing unit 404 may handle establishment, operation and termination of radio connections with the base station 110. The processing unit 404 may also perform signal processing operations for received radio signals. The processing unit 404 may be implemented by a digital signal processor with suitable software embedded in a computer readable medium, or by separate logic circuits, for example with ASIC (Application Specific Integrated Circuit).

The mobile subscriber unit 100 may additionally comprise a user interface 402 for interaction with a user of the mobile subscriber unit 100. The user interface 402 may comprise a display, a keypad or a keyboard, a loudspeaker, a microphone, etc.

Figure 5:
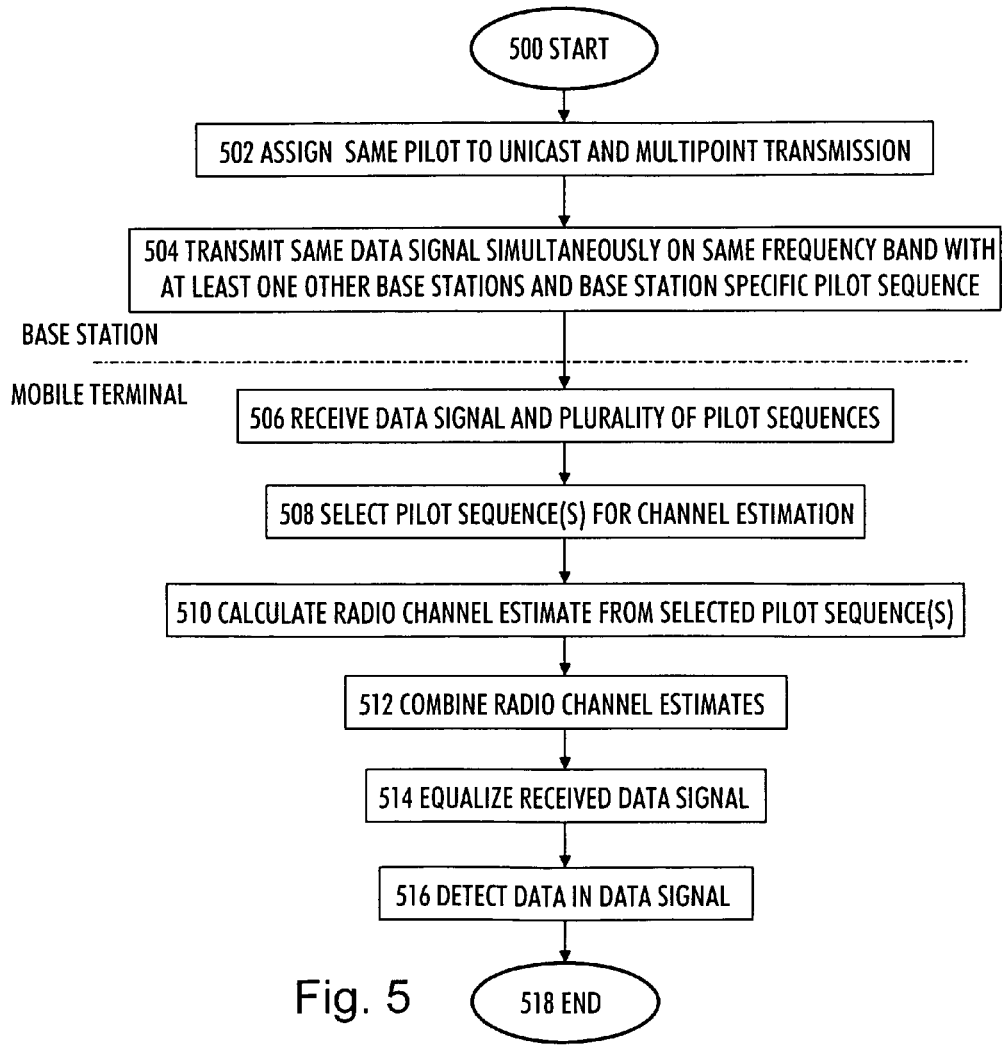
FIG. 5 is a flow diagram illustrating computer processes carried out in a base station and a mobile terminal of the mobile telecommunication system.

The processing unit 414 of the base station 110 may select trans-mission parameters and control transmission of radio signals in a computer process defined by instructions comprised in a computer program stored into a memory unit of the base station 110. Referring to FIG. 5, a computer process starts in block 500. In block 502, the processing unit 414 is configured to assign the same pilot sequence to unicast data transmission and multipoint data transmission. In block 504, the processing unit 414 is configured to control transmission of the same data signal simultaneously with at least one other base station of the mobile telecommunication system. The same data signal is transmitted on the same frequency band from the base stations. Additionally, the processing unit 414 may be configured to control transmission of the pilot sequence assigned to the base station 100.

Alternatively, block 502 may be carried out in the radio network controller. In that case the processing unit 414 of the base station receives from the radio network controller information instructing the processing unit 414 to use the same pilot sequence for the unicast data transmission and the multipoint data transmission.

The processing unit 404 of the mobile terminal 100 may process signals received from one or more base stations 110 to 130 in a computer process defined by instructions comprised in another computer program stored in a memory unit of the mobile terminal 100. Referring to FIG. 5, the data signal transmitted simultaneously from the base stations and a plurality of pilot sequences, each pilot sequence associated with a different base station, are received in block 506.

In block 508, one or more of the received pilot sequences are selected for channel estimation. The selection may be based on the measured reception power levels of the received pilot sequences. In block 510, radio channel properties are estimated from the selected pilot sequence(s). In block 512, the channel estimates are combined, and the received data signal is equalized with weights calculated from the combined channel estimates in block 514. The data comprised in the equalized data signal is demodulated and detected in block 516. The process ends in block 518.

The computer programs may be stored in computer program distribution media readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

Even though the invention has been described above with reference to an example according to the accompanying drawings, it is clear that the invention is not restricted thereto but it can be modified in several ways within the scope of the appended claims.

The invention claimed is:

1. A method, comprising:
    receiving a multicast data transmission comprising a transmission by a first base station and a transmission by at least a second base station and a plurality of different pilot sequences transmitted from the base stations, wherein a different one of the pilot sequence is transmitted from each of the base stations;
    receiving a unicast data transmission from the first base station;
    calculating a plurality of radio channel estimates wherein each of the plurality of radio channel estimates is calculated for a radio channel for a portion of a transmission, contributed by one of the base stations to the multicast data transmission, and wherein the radio channel estimate for a base station is calculated from the pilot sequence received from that base station; equalizing the received multicast data transmission by utilizing the calculated plurality of radio channel estimates; and
    equalizing the received unicast data transmission from the radio channel estimate utilizing the pilot sequence transmission by the first base station, wherein the pilot sequence transmission by the first base station is the same pilot sequence used in calculating the radio channel estimate for transmission of the multicast data transmission from the first base station;
    combining the plurality of radio channel estimates;
    wherein equalizing the received multicast data transmission comprises equalizing the received multicast data transmission with weights calculated from the combined radio channel estimates by multiplying frequency components of the received multicast data transmission with a component of the combined radio channel estimates.

2. The method of claim 1, wherein each of the plurality of pilot sequences is unique for one of the base stations.

3. The method of claim 1, further comprising:
    receiving the multicast data transmission in one or more frequency resource blocks allocated for the transmission of the multicast data transmission, the plurality of pilot sequences in the one or more frequency resource blocks allocated for the transmission of the multicast data transmission, and at least one pilot sequence in at least one frequency resource block allocated for the transmission of the unicast data transmission, and
    calculating the plurality of radio channel estimates from the plurality of pilot sequences received in the one or more frequency resource blocks allocated for the transmission of the multicast data transmission and from the at least one pilot sequence received in the at least one frequency resource block allocated for the unicast data transmission.

4. The method of claim 3, further comprising using in the calculation of the plurality of radio channel estimates the at least one pilot sequence received in a determined number of frequency resource blocks contiguous with respect to the one or more frequency resource blocks allocated for the transmission of the multicast data transmission.

5. The method of claim 4, further comprising determining the number of contiguous frequency resource blocks to be utilized in the calculation of the plurality of radio channel estimates on the basis of an estimated parameter describing a coherence bandwidth of the radio channel.

6. The method of claim 1, further comprising selecting a determined number of received pilot sequences for calculation of the radio channel estimates, wherein the selection is based on calculated reception power levels of the received pilot sequences.

7. The method of claim 6, further comprising selecting a given received pilot sequence for calculation of a radio channel estimate if the reception power level of the received pilot sequence exceeds a predetermined threshold level, and discarding the pilot sequence from the calculation of the radio channel estimate if the reception power level of the received pilot sequence is below the predetermined threshold level.

8. The method of claim 1, wherein the same multicast data transmission is received from the plurality of base stations simultaneously on the same frequency band.

9. The method of claim 1, further comprising configuring at least one base stations to use the same pilot sequence for the unicast data transmission and in a portion of a multicast data transmission on the same frequency band, wherein the portion of the multicast data transmission is contributed by the base station, wherein the multicast data transmission comprises a transmission of the base station and a transmission by at least one additional base station.

10. The method of claim 9, wherein the multicast data transmission comprises transmitting the same data signal from the base station and the at least one additional base station to the mobile terminal simultaneously.

11. The method of claim 9, further comprising:
    allocating a portion of a plurality of frequency resource blocks for the unicast data transmission and a portion of the plurality of frequency resource blocks for the multicast data transmission, and
    transmitting the same pilot sequence in the frequency resource block or blocks allocated for the unicast data transmission and in the frequency resource block or blocks allocated for the data transmission.

12. The method of claim 10, wherein the multicast data transmission further comprises synchronizing the transmission of the base station and the at least one additional base station.

13. The method of claim 10, wherein the multicast data transmission further comprises transmitting the same data signal from the base station and the at least one additional base station on the same frequency band.

14. An apparatus, comprising:
    an interface configured to receive a multicast data transmission, wherein the multicast data transmission comprises a transmission of a first base station and a transmission by at least a second base station and a plurality of different pilot sequences, wherein each of the plurality of pilot sequences is associated with one of the base stations, and wherein the interface is further configured to receive a unicast data transmission from one of the base stations; and a processing unit configured to calculate a plurality of radio channel estimates from the plurality of received pilot sequences, wherein each of the plurality of radio channel estimates is calculate for a radio channel for a portion of the multicast data transmission from one of the base stations and wherein the radio channel estimate for a base station is calculated from the pilot sequence received by that base station, wherein the processing unit is further configured to combine the plurality of radio channel estimates, wherein the processing unit is further configured to equalize the received multicast data transmission by utilizing the calculated plurality of radio channel estimates, and to detect data comprised in the equalized multicast data transmission, wherein equalizing further comprises equalizing the received multicast data transmission with weights calculated from the combine radio channel estimates by multiplying frequency components of the received multicast data transmission with a component of the combined radio channel estimates, and wherein the processing unit is further configured to equalize the unicast data transmission by utilizing the radio channel estimate calculated from the pilot signal associated with the first base station, wherein the pilot sequence transmitted by the first base station and used in calculating the radio channel estimate for the unicast data transmission is the same pilot sequence used in calculating the radio channel estimate for transmission of the multicast data transmission from the first base station.

15. The apparatus of claim 14, wherein each of the plurality of pilot sequences is unique for one of the base stations.

16. The apparatus of claim 14, wherein the interface is further configured to receive the multicast data transmission in one or more frequency resource blocks allocated for the transmission of the multicast data transmission, the plurality of pilot sequences in the one or more frequency resource blocks allocated for the transmission of the multicast data transmission, and at least one pilot sequence in at least one frequency resource block allocated for the transmission of a unicast data transmission, and the processing unit is further configured to calculate the plurality of radio channel estimates from the plurality of pilot sequences received in the one or more frequency resource blocks allocated for the transmission of the multicast data transmission and from the at least one pilot sequence received in the at least one frequency resource block allocated for the transmission of the unicast data transmission.

17. The apparatus of claim 16, wherein the processing unit is further configured to use in the calculation of the plurality of radio channel estimates the at least one pilot sequence received in a determined number of frequency resource blocks contiguous with respect to the one or more frequency resource blocks allocated for the transmission of the multicast data transmission.

18. The apparatus of claim 17, wherein the processing unit is further configured to determine the number of contiguous frequency resource blocks to be utilized in the calculation of the plurality of radio channel estimates on the basis of an estimated parameter describing a coherence bandwidth of the radio channel.

19. The apparatus of claim 14, wherein the processing unit is further configured to select a determined number of received pilot sequences for calculation of the radio channel estimates, wherein the selection is based on calculated reception power levels of the received pilot sequences.

20. The apparatus of claim 19, wherein the processing unit is further configured to select a given received pilot sequence for calculation of a radio channel estimate, if the reception power level of the received pilot sequence exceeds a predetermined threshold level, and to discard the pilot sequence from the calculation of the radio channel estimate, if the reception power level of the received pilot sequence is below the predetermined threshold level.

21. The apparatus of claim 14, wherein the interface is configured to receive the same multicast data transmission from the base stations simultaneously on the same frequency band.

22. The apparatus of claim 14, further comprising:
an additional processing unit configured to assign to at least one of the a base stations the same pilot sequence for use in a unicast data transmission and in a portion of a multicast data transmission, wherein the portion of the multicast data transmission is contributed by the one of the base station and is transmitted on the same frequency band, wherein the multicast data transmission comprises a transmission of the one of the base stations and a transmission by at least one additional base station.

23. The apparatus of claim 22, wherein the additional processing unit is further configured to control the at least one of the base stations to transmit to the mobile terminal simultaneously the same data as the at least one additional base station of the mobile telecommunication system.

24. The apparatus of claim 22, wherein the additional processing unit is further configured to allocate a portion of a plurality of frequency resource blocks for the unicast data transmission and a portion of the plurality of frequency resource blocks for the multicast data transmission, and to control the transmission of the same pilot sequence in the frequency resource block or blocks allocated for the unicast data transmission and in the frequency resource block or blocks allocated for the multicast data transmission.

25. The apparatus of claim 23, wherein the additional processing unit is further configured to synchronize the transmission of the at least one of the base stations to the transmission of the at least one additional base station of the mobile telecommunication system.

26. The apparatus of claim 23, wherein the additional processing unit is further configured to control the at least one of the base stations to transmit to the mobile terminal the same data as at least one additional base station of the mobile telecommunication system on the same frequency band.

27. A mobile telecommunication system, comprising:
an apparatus comprising:
a processing unit configured to assign to a base station of a mobile telecommunication system the same pilot sequence for use in a unicast data transmission and portion of a multicast data transmission, wherein the multicast data transmission comprises a transmission of the base station and a transmission by at least one additional base station,
an interface configured to receive a multicast data transmission, wherein the multicast data transmission comprises a transmission of a first base station and a transmission by at least a second base station and a plurality of different pilot sequences, wherein each of the plurality of pilot sequences is associated with one of the base stations, and wherein the interface is further configured to receive a unicast data transmission from one or the base stations; and the processing unit further configured to calculate a plurality of radio channel estimates from the plurality of received pilot sequences, wherein each of the plurality of radio channel estimates is calculated for a radio channel for a portion of the multicast data transmission from one of the base stations and wherein the radio channel estimate for a base station is calculated from the pilot sequence received by the base station, wherein the processing unit is further configured to combine the plurality of radio channel estimates, wherein the processing unit is further configured to equalize the received multicast data transmission by utilizing the calculated plurality of radio channel estimates, and to detect data comprised in the equalized multicast data transmission, wherein equalizing further comprises equalizing the received multicast data transmission with weights calculated from the combined radio channel estimates by multiplying frequency components of the received multicast data transmission with a component of the combined radio channel estimates, and wherein the processing unit is further configured to equalize the unicast data transmission by utilizing the radio channel estimate calculated from the pilot signal associated with the first base station, wherein the pilot sequence transmitted by the first base station and used in calculating the radio channel estimate for the unicast data transmission is the same pilot sequence used in calculating the radio channel estimate for transmission of the multicast data transmission from the first base station; and the mobile terminal comprising an interface configured to receive the multicast data transmission and a plurality of different pilot sequences, wherein each of the plurality of pilot sequences is associated with one of the base stations, and a processing unit configured to calculate a plurality of radio channel estimates from the plurality of received pilot sequences, to equalize the received multicast data transmission by utilizing the calculated plurality of radio channel estimates, and to detect data comprised in the equalized multicast data transmission.

28. An apparatus, comprising:

means for receiving a data signal and a plurality of different pilot sequences associated with a first base station and at least one additional base station, wherein a different one of the pilot sequences is transmitted from each of the base stations;

means for receiving a unicast data transmission from the first base station;

means for receiving a multicast data transmission from the first base station and from the at least a second base station, wherein the multicast data transmission comprises a transmission of the first base station and a transmission by the at least the second base station;

means for calculating a plurality of radio channel estimates from the plurality of received pilot sequences wherein each of the plurality of radio channel estimates is calculated for a radio channel for transmission of a portion of the multicast data transmission, wherein the portion of the multicast data transmission is contributed by one of the base stations and wherein the radio channel estimate for a base station is calculated from the pilot sequence received from that base station;

means for combining the plurality of radio channel estimates;

means for equalizing the received multicast data transmission by utilizing the calculated plurality of radio channel estimates, and to detect data comprised in the equalized multicast data transmission, wherein equalizing further comprises equalizing the received multicast data transmission comprises using weights calculated from the combined radio channel estimates by multiplying frequency components of the received multicast data transmission with a component of the combined radio channel estimates;

means for equalizing the unicast data transmission by utilizing the radio channel estimate calculated from the pilot signal associated with the first base station, wherein the pilot sequence transmitted by the first base station and used in calculating the radio channel estimate for the unicast data transmission is the same pilot sequence used in calculating the radio channel estimate for transmission of the portion of the multicast data transmission contributed by the first base station; and means for detecting data comprised in the equalized multicast data transmission and in the equalized unicast data transmission.

29. The apparatus of claim 28, further comprising means for assigning to a base station of a mobile telecommunication system the same pilot sequence for use in a unicast data transmission and in a portion of a multicast data transmission, wherein the portion of the multicast data transmission is contributed by the base station on the same frequency band.

30. A non-transitory computer readable medium storing a program of instructions, execution of which by a processor configures an apparatus to perform actions comprising at least:

receiving a multicast data transmission, wherein the multicast data transmission comprises a transmission of the base station and a transmission by at least one additional base station and a plurality of different pilot sequences associated with at least a first base station and a second base station, wherein a different one of the pilot sequences is transmitted from each of the base stations;

receiving a unicast data transmission from the first base station;

calculating a plurality of radio channel estimates wherein each of the plurality of radio channel estimates is calculated for a radio channel for transmission of the multicast data transmission from a base station and wherein the radio channel estimate for a base station is calculated from the pilot sequence received from that base station;

combining the plurality of radio channel estimates;

equalizing the received multicast data transmission by utilizing the calculated plurality of radio channel estimates, wherein equalizing further comprises equalizing the received multicast data transmission with weights calculated from the combined radio channel estimates comprises multiplying frequency components of the received multicast data transmission with a component of the combined radio channel estimates;

equalizing the received unicast data transmission from the radio channel estimate utilizing the pilot sequence transmitted by the first base station, wherein the pilot sequence transmitted by the first base station is the same pilot sequence used in calculating the radio channel estimate for transmission of the multicast data transmission from the first base station; and detecting data comprised in the equalized multicast data transmission and the equalized unicast data transmission.

31. The computer readable medium of claim 30, further comprising an additional computer readable medium storing a program of instructions, execution of which by a processor configures an apparatus to perform actions comprising at least:

assigning to at least one of the base stations of the mobile telecommunication system the same pilot sequence for use in a unicast data transmission and in a portion of a multicast data transmission on the same frequency band, wherein the multicast data transmission comprises a transmission of the base station and a transmission by at least one additional base station.

* * * * *

UNITED STATES PATENT AND TRADEMARK OFFICE
CERTIFICATE OF CORRECTION

PATENT NO. : 8,908,611 B2  
APPLICATION NO. : 12/072638  
DATED : December 9, 2014  
INVENTOR(S) : Jansen et al.

Page 1 of 1

It is certified that error appears in the above-identified patent and that said Letters Patent is hereby corrected as shown below:

In the Claims:

Claim 1, col. 11, line 31 "sequence" should be deleted and --sequences-- should be inserted.

Claim 1, col. 11, line 45 "transmission" should be deleted and --transmitted-- should be inserted.

Claim 1, col. 11, line 47 "transmission" should be deleted and --transmitted-- should be inserted.

Claim 14, col. 13, line 12 "calculate" should be deleted and --calculated-- should be inserted.

Claim 14, col. 13, line 24 "combine" should be deleted and --combined-- should be inserted.

Claim 27, col. 15, line 4 "or" should be deleted and --of-- should be inserted.

Claim 27, col. 15, line 13 "the" second occurrence should be deleted and --that-- should be inserted.

Signed and Sealed this  
Thirty-first Day of March, 2015

Michelle K. Lee  
*Director of the United States Patent and Trademark Office*